United States Patent Office 3,081,341
Patented Mar. 12, 1963

3,081,341
3-HALO-2,2-DISUBSTITUTED-1-PROPANOL CARBAMATES AND THEIR PREPARATION
Aram Mooradian, Nassau, N.Y., assignor to Sterling Drug Inc., New York, N.Y., a corporation of Delaware
No Drawing. Filed Mar. 10, 1958, Ser. No. 720,086
15 Claims. (Cl. 260—482)

This invention relates to new carbamates. More particularly, it concerns 3-halo-2,2-disubstituted-1-propanol carbamates and their preparation.

Carbamates of alkanols are known. According to the present invention, new and useful compounds are obtained when propanol is substituted in the 3-position with a halogen atom and the 2-position is substituted by lower-alkyl groups, one or both of which may, if desired, be further substituted by another halogen atom and the concept of the invention, therefore, resides in these substitutions.

The compounds provided by the invention have central nervous system depressant activity particularly as anti-convulsants and muscle relaxants of relatively low toxicity. They have a very rapid onset of action without concomitant loss of duration of action.

A preferred aspect of the invention relates to compounds having the formula

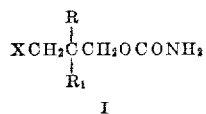

I wherein X is a halogen atom having an atomic number between 17 and 53, and R and $R_1$ are members of the group consisting of lower-alkyl radicals having from one to about six carbon atoms and halo-methyl radicals wherein the halogen atom has an atomic number between 17 and 35.

In the above general Formula I, X is a halogen atom having an atomic number between 17 and 53, i.e. chlorine, bromine and iodine.

The R and $R_1$ in the above general Formula I when lower-alkyl can be the same or different and can have from one to about six carbon atoms and thus can include methyl, ethyl, propyl, isopropyl, butyl, sec-butyl, pentyl, isopentyl, hexyl, isohexyl and the like. When $R_1$ is halomethyl, the halogen can have an atomic number between 17 and 35 thus including chlorine and bromine.

The new compounds are prepared by reacting the appropriately substituted 3-halo-1-propanol with an equivalent amount of phosgene at a temperature between about $-10°$ and $0°$ C. in the presence of an equimolar amount of an acid-acceptor, for example, sodium hydroxide, pyridine, dialkylaniline, etc. to form the chlorocarbonate derivative. The chlorocarbonate is best prepared in an organic solvent inert to the reaction conditions, for example, chloroform, benzene, toluene, xylene and the like, then ammoniated to the desired carbamate using any suitable source of ammonia, for example, anhydrous ammonia, ammonium hydroxide, etc.

Although the intermediate alcohols are not new as a class and their general method of preparation is thus known, relatively few have been specifically described. They are prepared by heating the appropriately substituted di- or triol with a thionyl halide in the presence of an organic base, for example, pyridine. When it is desired to prepare a mono-halo compound, an equivalent amount of thionyl halide and organic base is used. If, however, a dihalo compound is desired, it is, of course, necessary to use a molar excess of thionyl halide and organic base. The reaction is best carried out by heating the reactants to reflux until the evolution of gas is complete, then isolating the product by extraction and distillation. Alternatively, the reaction can be conducted in an organic solvent miscible with and inert to the reactants, for example, benzene, toluene, xylene, chloroform etc. In this case, the reaction is carried out at a temperature between about $50°$ C. and $150°$ C. but if a solvent is selected which boils in this range it is convenient to carry out the reaction at the reflux temperature of the solvent.

In some cases, the preparation of the bromo and iodo compounds, for example, it is preferred to use an alternative method for the preparation of the intermediate alcohols. This method involves the cleavage of a 3,3-disubstituted oxetane (trimethylene oxide) with an equivalent amount of a hydrogen halide dissolved in an anhydrous organic solvent, for example, diethyl ether. The oxetanes are a known class of compounds and can be prepared by dehydrohalogenation of appropriate 1,3-halohydrins.

The preparation of the intermediates for the trihalo compounds follows the same line as above. Thus, 3-chloro-2,2-bis(chloromethyl)-1-propanol and 3-bromo-2,2-bis(bromomethyl)-1-propanol are prepared by reacting pentaerythritol with a two molar excess of the appropriate thionyl halide and organic base while those compounds containing different halogen atoms are best prepared by cleavage of the appropriately substituted oxetane with an equivalent amount of a hydrogen halide.

The structures of the compounds of the invention are established by chemical analysis and by the preparative methods used in their synthesis.

The activity of the compounds in animal organisms was gauged quantitatively by the mean effective dose ($ED_{50}$) to cause paralysis and by the mean protective dose ($PD_{50}$) against shock either electrically or chemically induced.

The $ED_{50}$ and $PD_{50}$ determinations and their respective standard errors as described below are based upon three or more logarithmically graded dose levels using ten mice per dose level and were calculated by the log-probit method of Miller and Tainter. The carbamates were administered as suspensions in aqueous 1.0 percent gum tragacanth. A pretreatment time of five minutes was used, this being the time of maximal paralyzing and anti-electroshock activity following intraperitoneal injection and which was estimated from the incidence of paralysis and the incidence of animals protected from maximal electroshock seizures as a function of time.

The intraperitoneal median paralyzing dose ($ED_{50}$) for each compound was determined by an inclined screen procedure.

The intraperitoneal median protective dose ($PD_{50}$) for each compound against maximal electroshock seizures (MES) induced in mice using a slight modification of the method of Swinyard, Brown and Goodman, was determined from the percent of animals protected from the hind limb extensor component of the maximal seizure pattern as a function of dose.

The intraperitoneal median protective dose ($PD_{50}$) for each compound against chemoshock death was determined by intravenous injection of medicated mice with lethal doses ($LD_{100}$) of either strychnine hydrochloride (0.9 mg./kg.; 0.009% solution) or pentylenetetrazole (obtainable under the registered trademark, Metrazol; 100 mg./kg.; 1% solution) injected at a rate of 1 ml./min. The incidence of sixty minute survivors following either convulsant was used in determining the $PD_{50}$ (death) and at higher pretreatment dose levels, the incidence of complete protection from Metrazol convulsions following the $LD_{100}$ was used in determining the $PD_{50}$ (convulsions).

The effects of the carbamates in unanesthetized cats were determined in from two to four animals at each of two or more dose levels. At doses ranging from 50–200 mg./kg. the compounds produced ataxia and the animals were unable to stand. The duration of action varied from 6–72 hours.

The following examples will further illustrate the invention without, however, limiting the same thereto.

EXAMPLE 1

(a) *2,2-Bis(Chloromethyl)-1-Butanol*

A mixture of 135 g. of 2-ethyl-2-hydroxymethyl-1,3-propanediol and 158 g. of pyridine was heated to reflux in a flask fitted with a stirrer, condenser and dropping funnel. To the refluxing solution was added dropwise 238 g. of thionyl chloride and the mixture refluxed until the evolution of gas was complete and then left standing overnight at room temperature. The resultant solution was taken up in ethyl ether and water added. The ether layer was separated, washed with cold dilute hydrochloric acid, and dried over sodium sulfate. After the ether was removed by evaporation the residue was distilled to yield 89.6 g. of 2,2-bis(chloromethyl)-1-butanol, B.P. 129° C./27 mm.

*Anal.*—Calcd. for $C_6H_{12}Cl_2O$: C, 42.20; H, 7.07; Cl, 41.45. Found: C, 42.30; H, 7.19; Cl, 41.41.

(b) *2,2-Bis(Chloromethyl)-1-Butanol Carbamate* [I; X is Cl; R is —$C_2H_5$; $R_1$ is —$CH_2Cl$]

A solution of 17.1 g. of 2,2-bis(chloromethyl)-1-butanol and 12.1 g. of dimethylaniline in 50 ml. of chloroform was added to 10 g. of phosgene in 100 ml. of toluene at a temperature between —10° and 0° C. After the addition was complete the solution was left standing overnight at room temperature, and then gaseous ammonia was bubbled in until the solution was saturated. The ammonium chloride which precipitated was removed by suction filtration and the toluene-chloroform solution washed with dilute hydrochloric acid. The solvent was removed by distillation under reduced pressure, whereupon the residual oil crystallized. After recrystallization from n-pentane-benzene there was obtained 14 g. of 2,2-bis(chloromethyl)-1-butanol carbamate, M.P. 78–79° C. (corr.).

*Anal.*—Calcd. for $C_7H_{13}Cl_2NO_2$: Cl, 33.12; N, 6.54. Found: Cl, 33.00; N, 6.50.

2,2-bis(chloromethyl)-1-butanol carbamate has central nervous system depressant activity as illustrated by the following data obtained using the procedures described above. The $PD_{50}$'s against MES, strychnine and pentylenetetrazole were found to be 39±2.7 mg./kg., 48±8.6 mg./kg. and 30±4.2 mg./kg. (convulsions) and 22±3 mg./kg. (death) respectively; the $ED_{50}$ was found to be 67±5.4 mg./kg. and the acute intraperitoneal and oral toxicities were found to be 580±150 mg./kg. and 1750 mg./kg. respectively.

EXAMPLE 2

(a) *(2,2-bis(chloromethyl)-1-propanol* was prepared from 252 g. of 2-methyl-2-hydroxymethyl-1,3-propanediol, 332 g. of pyridine and 500 g. of thionyl chloride using the manipulative procedure described above in Example 1(a). The 63 g. of 2,2-bis(chloromethyl)-1-propanol thus obtained had the B.P. 116–120° C./32 mm.

*Anal.*—Calcd. for $C_5H_{10}Cl_2O$: C, 38.21; H, 6.42; Cl, 44.52. Found: C, 38.14; H, 6.77; Cl, 44.56.

(b) *2,2-bis(chloromethyl)-1-propanol carbamate* [I; X is Cl; R is —$CH_3$; $R_1$ is —$CH_2Cl$] was prepared from 62.8 g. of 2,2-bis(chloromethyl)-1-propanol and 49 g. of dimethylaniline in 200 ml. of chloroform and 40 g. of phosgene in 400 ml. of toluene according to the manipulative procedure described above in Example 1(b). After recrystallization from benzene there was obtained 55 g. of 2,2-bis(chloromethyl)-1-propanol carbamate, M.P. 75.5–78.5° C. (corr.).

*Anal.*—Calcd. for $C_6H_{11}Cl_2NO_2$: Cl, 35.45; N, 7.01. Found: Cl, 35.24; N, 6.97.

2,2-bis(chloromethyl)-1-propanol carbamate has central nervous system depressant activity as illustrated by the following data obtained using the procedures described above. The $PD_{50}$'s against MES, strychnine and pentylenetetrazole were found to be 40±3.2 mg./kg., 47±6.5 mg./kg. and 46±10 mg./kg. (convulsions) and 39.5±8 mg./kg. (death) respectively; the $ED_{50}$ was found to be 76±5 mg./kg. and the acute intraperitoneal and oral toxicities were found to be 631±67 mg./kg. and 1500 mg./kg. respectively.

EXAMPLE 3

(a) *2-chloromethyl-2-methyl-1-pentanol* was prepared from 330 g. of 2-methyl-2-propyl-1,3-propanediol, 198 g. of pyridine and 297 g. of thionyl chloride using the manipulative procedure described above in Example 1(a). The 158 g. of 2-chloromethyl-2-methyl-1-pentanol thus obtained had the B.P. 104–108° C./23 mm.

(b) *2-chloromethyl-2-methyl-1-pentanol carbamate* [I; X is Cl; R is $CH_3$; $R_1$ is $C_3H_7$] was prepared from 15.1 g. of 2-chloromethyl-2-methyl-1-pentanol and 12.1 g. of dimethylaniline in 150 ml. of toluene and 10 g. of phosgene in 50 ml. of chloroform according to the manipulative procedure described above in Example 1(b). After recrystallization from n-pentane there was obtained 14.5 g. of 2-chloromethyl-2-methyl-1-pentanol carbamate, M.P. 51–53° C. (corr.)

*Anal.*—Calcd. for $C_8H_{16}ClNO_2$: C, 18.30; N, 7.23. Found: C, 18.47; N, 7.23.

2-chloromethyl-2-methyl-1-pentanol carbamate has central nervous system depressant activity as illustrated by the following data obtained using the procedures described above. The $PD_{50}$'s against MES, strychnine and pentylenetetrazole were found to be 33±2.1 mg./kg., 55±7.6 mg./kg. and 54±8.7 mg./kg. (convulsions) and 53±8.7 mg./kg. (death) respectively; the $ED_{50}$ was found to be 67±4.4 and the acute intraperitoneal and oral toxicities were found to be 385±58 mg./kg. and 1250 mg./kg. respectively.

EXAMPLE 4

(a) *3-chloro-2,2-dimethyl-1-propanol* was prepared from 156 g. of 2,2-dimethyl-1,3-propanediol, 120 g. of pyridine and 180 g. of thionyl chloride using the manipulative procedures described above in Example 1(a). The 56 g. of 3-chloro-2,2-dimethyl-1-propanol thus obtained had the B.P. 84–86° C./32 mm.

(b) *3-chloro-2,2-dimethyl-1-propanol carbamate* [I; X is Cl; R is $CH_3$; $R_1$ is $CH_3$] was prepared from 56 g. of 2,2-dimethyl-3-chloro-1-propanol and 56 g. of dimethylaniline in 250 ml. of chloroform and 46 g. of phosgene in 450 ml. of toluene according to the manipulative procedure described above in Example 1(b). Recrystallization from benzene gave 35 g. of 3-chloro-2,2-dimethyl-1-propanol carbamate, M.P. 79–81.5° C. (corr.).

*Anal.*—Calcd. for $C_6H_{12}ClNO_2$: Cl, 21.40; N, 8.46. Found: Cl, 21.72; N, 8.46.

3-chloro-2,2-dimethyl-1-propanol carbamate has central nervous system depressant activity as illustrated by the following data obtained using the procedures described above. The PD$_{50}$'s against MES, strychnine and pentylenetetrazole were found to be 67±5.1 mg./kg., 100±16 mg./kg. and 104±18 mg./kg. (convulsions) and 74±13 mg./kg. (death) respectively; the ED$_{50}$ was found to be 185±20 mg./kg. and the acute intraperitoneal and oral toxicities were found to be 550±86 mg./kg. and 2000 mg./kg. respectively.

EXAMPLE 5

(a) 2,2-bis(chloromethyl)-1-pentanol was prepared from 49.3 g. of 2-hydroxymethyl-2-propyl-1,3-propanediol, 53 g. of pyridine and 80 g. of thionyl chloride using the manipulative procedure described above in Example 1(a). The 30 g. of 2,2-bis(chloromethyl)-1-pentanol thus obtained had the B.P. 124–127° C./15 mm.

(b) 2,2-Bis(Chloromethyl)-1-Pentanol Carbamate
[I; X is Cl; R is —C$_3$H$_7$; R$_1$ is —CH$_2$Cl]

To a solution of 12 g. of phosgene in 120 ml. of toluene at 0° C. was added dropwise a solution of 22.1 g. of 2,2-bis(chloromethyl)-1-pentanol and 14.6 g. of dimethylaniline in 45 ml. of chloroform. After the addition was complete the solution was allowed to warm to room temperature and then left standing overnight. The resultant solution was saturated with gaseous ammonia, diluted with water and shaken after adding an equal volume of ether. The organic layer was separated, washed with dilute hydrochloric acid and distilled under reduced pressure to remove the solvents. The residue which crystallized immediately was taken up in ether and treated with decolorizing charcoal. Most of the ether was removed by distillation and the product which precipitated upon addition of n-hexane was collected by suction filtration and dried. The white crystals of 2,2-bis(chloromethyl)-1-pentanol carbamate thus obtained had the M.P. 80–82° C. (corr.).

*Anal.*—Calcd. for C$_8$H$_{15}$Cl$_2$NO$_2$: C, 31.09; N, 6.14. Found: Cl, 30.68; N, 6.11.

2,2-bis(chloromethyl)-1-pentanol carbamate has central nervous system depressant activity as illustrated by the following data obtained using the procedures described above. The PD$_{50}$'s against MES, strychnine and pentylenetetrazole were 37±2.5 mg./kg., 41.5±7.3 mg./kg. and 33±5 mg./kg. (convulsions) and 23±3.2 mg./kg. (death) respectively; the ED$_{50}$ was 67.5±4.7 and the acute intraperitoneal and oral toxicities were 660±72 and 2440±310 respectively.

EXAMPLE 6

(a) 2-chloromethyl-2-ethyl-1-butanol was prepared from 132 g. of 2,2-diethyl-1,3-propanediol, 158 g. of pyridine and 119 g. of thionyl chloride using the manipulative procedures described above in Example 1(a). There was thus obtained 116 g. of 2-chloromethyl-2-ethyl-1-butanol, B.P. 95–100° C./11 mm.

(b) 2-chloromethyl-2-ethyl-1-butanol carbamate [I; X is Cl; R is C$_2$H$_5$; R$_1$ is C$_2$H$_5$] was prepared from 31.3 g. of 2-chloromethyl-2-ethyl-1-butanol and 24.2 g. of dimethylaniline in 100 ml. of chloroform and 20 g. of phosgene in 200 ml. of toluene according to the manipulative procedure described above in Example 5(a). After recrystallization from n-hexane there was obtained 12 g. of 2-chloromethyl-2-ethyl-1-butanol carbamate, M.P. 91.5–94.0° C. (corr.).

*Anal.*—Calcd. for C$_8$H$_{16}$ClNO$_2$: C, 18.30; N, 7.23. Found: C, 18.10; N, 7.30.

2-chloromethyl-2-ethyl-1-butanol carbamate has central nervous system depressant activity as illustrated by the following data obtained using the procedures described above. The PD$_{50}$'s against MES, strychnine and pentylenetetrazole were 29.6±1.1 mg./kg., 54±7.5 mg./kg. and 43±7.7 mg./kg. (convulsions) and 26.5±3.7 mg./kg. (death) respectively; the ED$_{50}$ was 60.5±6.7 mg./kg. and the acute intraperitoneal and oral toxicities were 415 mg./kg. and 1750 mg./kg. respectively.

EXAMPLE 7

(a) 2,2-bis(chloromethyl)-1-heptanol was prepared from 280 g. of 2-hydroxymethyl-2-n-pentyl-1,3-propanediol, 200 g. of pyridine and 300 g. of thionyl chloride according to the manipulative procedure described above in Example 1(a). The 66 g. of 2,2-bis(chloromethyl)-1-heptanol thus obtained had the B.P. 168–170° C./27 mm.

(b) 2,2-bis(chloromethyl)-1-heptanol carbamate [I; X is Cl; R is C$_5$H$_{11}$; R$_1$ is CH$_2$Cl] was prepared from 21.2 g. of 2,2-bis(chloromethyl)-1-heptanol and 14.5 g. of dimethylaniline in 100 ml. of chloroform and 12 g. of phosgene in 200 ml. of toluene using the manipulative procedure described above in Example 1(b). There was thus obtained 12.6 of 2,2-bis(chloromethyl)-1-heptanol carbamate, M.P. 65–67.5° C. (corr.).

*Anal.*—Calcd. for C$_{10}$H$_{19}$Cl$_2$NO$_2$: C, 27.69; N, 5.46. Found: C, 27.63; N, 5.63.

2,2-bis(chloromethyl)-1-heptanol carbamate has central nervous system depressant activity as illustrated by the following data obtained using the procedures described above. The PD$_{50}$'s against MES, strychnine and pentylenetetrazole were 81±11 mg./kg., 145±25 mg./kg. and 275±67 mg./kg. (convulsions) and 81±19 mg./kg. (death) respectively; the ED$_{50}$ was 182±30 mg./kg. and the acute intraperitoneal and oral toxicities were 1160±280 mg./kg. and >4000 mg./kg. respectively.

EXAMPLE 8

(a) 2-Bromomethyl-2-Methyl-1-Pentanol

To a solution of 10 g. of hydrogen bromide in 250 ml. of anhydrous ethyl ether was slowly added 11.4 g. of 3-methyl-3-n-propyloxetane. After the vigorous reaction had subsided, the solution was left standing over night. The ether was removed by distillation and the residue distilled to give 16 g. of 2-bromomethyl-2-methyl-1-pentanol, B.P. 106–107°/13 mm.

*Anal.*—Calcd. for C$_7$H$_{15}$BrO: C, 43.09; H, 7.75; Br, 40.97. Found: C, 43.38; H, 7.76; Br, 41.15.

The 3-methyl-3-n-propyloxetane used above was prepared from 75.3 g. of 2-chloromethyl-2-methyl-1-pentanol [Example 3(a)] in 500 ml. of absolute ethyl alcohol and 11.5 g. of sodium dissolved in 250 ml. of absolute alcohol. After refluxing for 4 hours, the salt was removed by suction filtration and the filtrate carefully distilled to remove the alcohol. Distillation of the residue gave 43.5 g. of 3-methyl-3-n-propyloxetane, B.P. 139–140° C.

*Anal.*—Calcd. for C$_7$H$_{14}$O: C, 73.60; H, 12.36. Found: C, 73.53; H, 11.98.

(b) 2-bromomethyl-2-methyl-1-pentanol carbamate [I; X is Br; R is C$_3$H$_7$; R$_1$ is CH$_3$] was prepared from 14 g. of 2-bromomethyl-2-methyl-1-pentanol and 8.7 g. of dimethylaniline in 40 ml. of chloroform and 8 g. of phosgene in 110 ml. of toluene using the manipulative procedure described above in Example 5. After recrystallization from an ether-hexane mixture, there was obtained 7.1 g. of 2-bromomethyl-2-methyl-1-pentanol carbamate, M.P. 58–60.5° C. (corr.).

*Anal.*—Calcd. for C$_8$H$_{16}$BrNO$_2$: Br, 33.56; N, 5.88. Found: Br, 33.64; N, 5.89.

EXAMPLE 9

(a) 2-iodomethyl-2-methyl-1-pentanol was prepared from 11.4 g. of 3-methyl-3-n-propyloxetane in 100 ml. of anhydrous diethylether and 27 g. of 50% hydrogen iodide using the manipulative procedure described above in Example 8(a). There was thus obtained 21.3 g. of 2-iodomethyl-2-methyl-1-pentanol, B.P. 118°/11 mm.

(b) 2-iodomethyl-2-methyl-1-pentanol carbamate [I; X is I; R is C$_3$H$_7$; R$_1$ is CH$_3$] was prepared from 16 g.

of 2-iodomethyl-2-methyl-1-pentanol in 75 ml. of dry toluene and 6.7 g. of dimethylaniline in 125 ml. of toluene and 50 ml. of chloroform according to the manipulative procedure described above in Example 5(b). After recrystallization from n-hexane there was obtained 11 g. of 2-iodomethyl-2-methyl-1-pentanol carbamate, M.P. 56-58° C. (corr.).

Anal.—Calcd. for $C_8H_{16}INO_2$: I, 44.51; C, 33.70; H, 5.66. Found: I, 44.06; C, 33.72; H, 5.82.

EXAMPLE 10

(a) *2-chloromethyl-2-methyl-1-butanol* was prepared from 20.5 g. of 2-methyl-2-ethyl-1,3-propanediol and 27 g. of pyridine and 20.2 g. of thionyl chloride according to the manipulative procedure described above in Example 1(a). The 2-chloromethyl-2-methyl-1-butanol had the B.P. 132-136° C./100 mm.

(b) *2-chloromethyl-2-methyl-1-butanol carbamate* [I; X is Cl; R is $C_2H_5$; $R_1$ is $CH_3$] was prepared from 11 g. of phosgene in 75 ml. of dry toluene and 13.2 g. of dimethylaniline and 15 g. of 2-chloromethyl-2-methyl-1-butanol in 50 ml. of chloroform according to the manipulative procedure described above in Example 1(b). After recrystallization from n-hexane, there was obtained 4.5 g. of 2-chloromethyl-2-methyl-1-butanol carbamate, M.P. 52.5-54.5° C. (corr.).

Anal.—Calcd. for $C_7H_{14}ClNO_2$: Cl, 19.73; N, 7.80. Found: Cl, 19.87; N, 7.73.

EXAMPLE 11

*3-chloro-2,2-bis(chloromethyl)-1-propanol carbamate* [I; X is Cl; R is —$CH_2Cl$; $R_1$ is —$CH_2Cl$] was prepared from 10 g. of phosgene in 100 ml. of dry toluene and 13.2 g. of dimethylaniline and 19.2 g. of 3-chloro-2,2-bis(chloromethyl)-1-propanol in 50 ml. of chloroform according to the manipulative procedure described above in Example 1(b). After recrystallization from n-hexane, there was obtained 11 g. of 3-chloro-2,2-bis(chloromethyl)-1-propanol, M.P. 58-60° C.

3-chloro-2,2-bis(chloromethyl)-1-propanol carbamate has central nervous system depressant activity as illustrated by the following data obtained using the procedures described above. The $PD_{50}$ against MES was $40.5 \pm 5$ and the $ED_{50}$ was $76.5 \pm 7.5$.

According to the manipulative procedures described in the above examples, 2,2-bis(bromomethyl)-1-butanol carbamate can be prepared by reacting 2,2-bis(bromomethyl)-1-butanol, prepared by heating 2-ethyl-2-hydroxymethyl-1,3-propanediol with thionyl bromide, with phosgene and ammonia; 2,2-bis(bromomethyl)-1-propanol carbamate can be prepared by reacting 2,2-bis(bromomethyl)-1-propanol, prepared by heating 2-methyl-2-hydroxymethyl-1,3-propanediol and thionyl bromide, with phosgene and ammonia; 3-bromo-2,2-dimethyl-1-propanol carbamate can be prepared by reacting 2,2-dimethyl-3-bromo-1-propanol, prepared by heating 2,2-dimethyl-1,3-propanediol with thionyl bromide, with phosgene and ammonia; 2-bromomethyl-2-chloromethyl-1-pentanol carbamate can be prepared by reacting 3-chloromethyl-3-n-propyloxetane, prepared by heating 2,2-bis(chloromethyl)-1-pentanol with sodium and absolute alcohol, with hydrogen bromide; 2-iodomethyl-2-propyl-1-hexanol carbamate can be prepared by reacting 2-iodomethyl-2-propyl-1-hexanol, prepared by heating 3-n-butyl-3-propyloxetane with hydrogen iodide, with phosgene and ammonia; 2-chloromethyl-2-iodomethyl-1-butanol carbamate can be prepared by reacting 2-chloromethyl-2-iodomethyl-1-butanol, prepared by heating 3-chloromethyl-3-ethyloxetane, with hydrogen iodide; 2-bromomethyl-2-iodomethyl-1-propanol carbamate can be prepared by reacting 2-bromomethyl-2-iodomethyl-1-propanol, prepared by heating 3-bromomethyl-3-methyloxetane with hydrogen iodide, with phosgene and ammonia; 2,2-bis(chloromethyl)-1-isobutanol carbamate can be prepared by reacting 2,2-bis(chloromethyl)-1-isopentanol, prepared by heating 2-hydroxymethyl-2-isopropyl-1,3-propanediol with thionyl chloride, with phosgene and ammonia; 2-bromomethyl-2-ethyl-1-isohexanol carbamate can be prepared by reacting 2-bromomethyl-2-ethyl-1-isohexanol, prepared by heating 2-ethyl-2-isobutyl-1,3-propanediol with thionyl bromide, with phosgene and ammonia; and 2,2-bis(chloromethyl)-3-iodo-1-propanol carbamate can be prepared by reacting 2,2-bis(chloromethyl)-3-iodo-1-propanol, prepared by heating 3,3-bis(chloromethyl)oxetane with hydrogen iodide with phosgene and ammonia.

Pharmacological evaluation of the compounds of the invention in mice and cats has demonstrated that they possess depressant actions on the central nervous system. They protect animals against lethal doses of strychnine and pentylenetetrazole, they have pronounced anti-electroshock activity, and they have a paralyzing action. These properties indicate their usefulness as central nervous system depressants, particularly as anti-convulsants for use, for example, in epilepsy, particularly petit mal, and as muscle relaxants with a rapid onset of action. The compounds can be formulated in unit dosage form as tablets in combination with suitable adjuvants such as: calcium carbonate, starch, gelatin, talc, magnesium stearate, gum acacia, and the like; or alternatively they can be employed in capsule form either alone or admixed with an adjuvant. Still further, the compounds can be formulated for oral administration as aqueous-alcohol solutions, oil solutions, or oil-water emulsions, in the same manner in which conventional medicinal substances are prepared.

I claim:

1. A compound having the formula

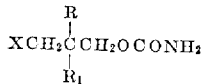

wherein X is a halogen atom having an atomic number between 17 and 53; and R and $R_1$ are members of the group consisting of lower-alkyl groups having from one to six carbon atoms and halomethyl groups wherein the halogen has an atomic number between 17 and 35.

2. A compound having the formula

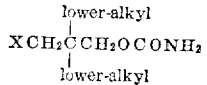

wherein X is a halogen atom having an atomic number between 17 and 53 and the lower-alkyl groups have from one to six carbon atoms.

3. A compound having the formula

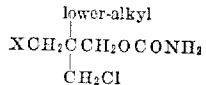

wherein X is a halogen atom having an atomic number between 17 and 53 and the lower-alkyl group has from one to six carbon atoms.

4. A compound having the formula

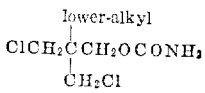

wherein the lower-alkyl group has from one to six carbon atoms.

5. 2,2-bis(chloromethyl)-1-butanol carbamate.
6. 2,2-bis(chloromethyl)-1-propanol carbamate.
7. 2,2-bis(chloromethyl)-1-pentanol carbamate.
8. 2-bromomethyl-2-methyl-1-pentanol carbamate.
9. 2,2-bis(chloromethyl)-1-heptanol carbamate.
10. 2-chloromethyl-2-methyl-1-pentanol carbamate.
11. 3-chloro-2,2-dimethyl-1-propanol carbamate.
12. 2-chloromethyl-2-ethyl-1-butanol carbamate.
13. 2-iodomethyl-2-methyl-1-pentanol carbamate.

14. 2-chloromethyl-2-methyl-1-butanol carbamate.
15. 3-chloro-2,2-bis(chloromethyl)-1-propanol carbamate.

References Cited in the file of this patent

UNITED STATES PATENTS

| | | |
|---|---|---|
| 1,108,676 | Beckmann | Aug. 25, 1914 |
| 1,424,236 | Callsen | Aug. 1, 1922 |
| 1,658,231 | Dox et al. | Feb. 7, 1928 |
| 2,197,479 | Meigs | Apr. 16, 1940 |

FOREIGN PATENTS

| | | |
|---|---|---|
| 254,471 | Germany | Dec. 4, 1912 |
| 62,684 | Switzerland | Dec. 23, 1912 |

OTHER REFERENCES

Beilstein: Band 3, pages 24 and 29 (1918).
Beilstein: Band 3–4 (Erstes), page 13 (1929).
Beilstein: Band 3–4 (Zweites), pages 22, 25 and 26 (1942).
Rice: J. Am. Pharm. Assoc., vol. 33, No. 9, pages 289–293 (1944).
Conant et al.: The Chem. of Org. Cpds., pages 320-1 (1952), 4th ed.

UNITED STATES PATENT OFFICE
CERTIFICATE OF CORRECTION

Patent No. 3,081,341                               March 12, 1963

Aram Mooradian

It is hereby certified that error appears in the above numbered patent requiring correction and that the said Letters Patent should read as corrected below.

Column 6, line 18, for "12.6" read -- 12.6 g. --.

Signed and sealed this 3rd day of December 1963.

(SEAL)
Attest:

ERNEST W. SWIDER

Attesting Officer

EDWIN L. REYNOLDS

Acting Commissioner of Patents